United States Patent [19]

Haapala

[11] 4,051,600
[45] Oct. 4, 1977

[54] GARLAND MARKER FOR FANCY CAKES

[76] Inventor: Ray Haapala, Rte. 3, Box 76, Dassel, Minn. 55325

[21] Appl. No.: 725,646

[22] Filed: Sept. 22, 1976

[51] Int. Cl.² ............................................. G01B 5/20
[52] U.S. Cl. ................................... 33/174 T; 33/177
[58] Field of Search .................... 33/174 T, 1 F, 176, 33/177

[56] References Cited
U.S. PATENT DOCUMENTS

| 199,917 | 2/1878 | Marshall | 33/177 |
| 963,445 | 7/1910 | Kinney | 33/177 |
| 1,593,257 | 7/1926 | Hawksworth | 33/177 |
| 3,754,334 | 8/1973 | Haapala | 33/174 T |

Primary Examiner—Richard E. Aegerter
Assistant Examiner—Richard R. Stearns

[57] ABSTRACT

A bowed resilient strip having a toothed edge is slidably supported in slots on two slides which are slidable along a graduated rod. Adjustment of the distance between the slides per the graduations determines the even number of garlands which can be scribed by the teeth into the icing on a cake side, and adjustment of the length of the strip between the slides determines the depth of the bow of the inscription.

1 Claim, 5 Drawing Figures

GARLAND MARKER FOR FANCY CAKES

FIELD OF INVENTION

Geometrical Instruments, Gauges, Food.

PRIOR ART

Buttress U.S. Pat. No. 2,217,998; Haapala U.S. Pat. No. 3,754,334.

OBJECTS

One of the classic decorations for a fancy cake is the garland. These are formed of colored icing which is either extended onto the cake icing through a shaped nozzle, or applied in string-like strips. In my prior U.S. Pat. No. 3,754,330, there is disclosed a garland marker comprising a bowed resilient strip having a toothed edge, the strip being slidably supported at spaced points on a rod.

Another type of garland marker which has been marketed comprises a flat rod with slots in one edge thereof, and a bowed resilient strip with a serrated edge engaged at spaced locations along its length in selected ones of the slots. With this device an even number of garland markings, e.g., eight, can be inscribed on round cakes of various sizes, according to which slots are used. A device of this type is usable on a cake of a certain form, round or square, but not both.

While the prior art devices have enjoyed a certain measure of success, there are certain improvements which would make it more useful, and these are the subject of this invention.

A primary object of this invention is to provide a garland marker which can be so adjusted, according to graduations, as to produce a given even number of garlands, e.g., eight, on round cakes of various diameters; and, alternatively, on square cakes of various sizes.

A further object of this invention is to provide a garland marker which is easy to adjust to round or square cakes of different sizes, and which can be inexpensively made of easily manufactured and assembled parts.

These and other objects will be apparent from the following specification and drawing, in which.

Figure 1:
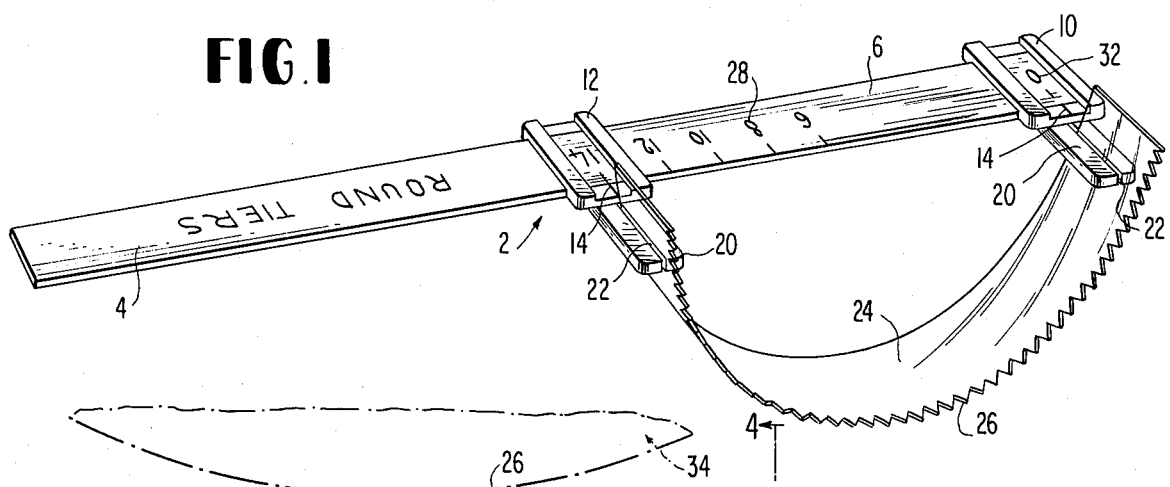
FIG. 1 is a perspective view of the garland marker as used for scribing garland marks on the sides of round cakes.

Referring now to the drawings in which like reference numerals denote similar elements, the garland marker 2 consists of a stiff rod 4 having flat opposite sides 6 and 8 with slides 10 and 12 thereon. The slides have index numbers 28 and 30 on their front and rear sides and may, if desired, be formed with small bumps 18 on surfaces thereof which slide against a side of the rod so as to concentrate the friction of the slides against the rods and thereby hold them in adjusted position. Each slide has thereon an upstanding tongue 20 with a slot 22 extending inwardly from the end of the tongue, through which slots a resilient bowed strip 24 having serrations 26 along one edge thereof is slidably engaged. On side 6 of the rod are index numbers 28 for round cakes and on side 8 of the rod are index numbers 30 for square cakes. On each side of the rod are zero point numbers which denote the location where one of the slides is always placed.

Figure 2:
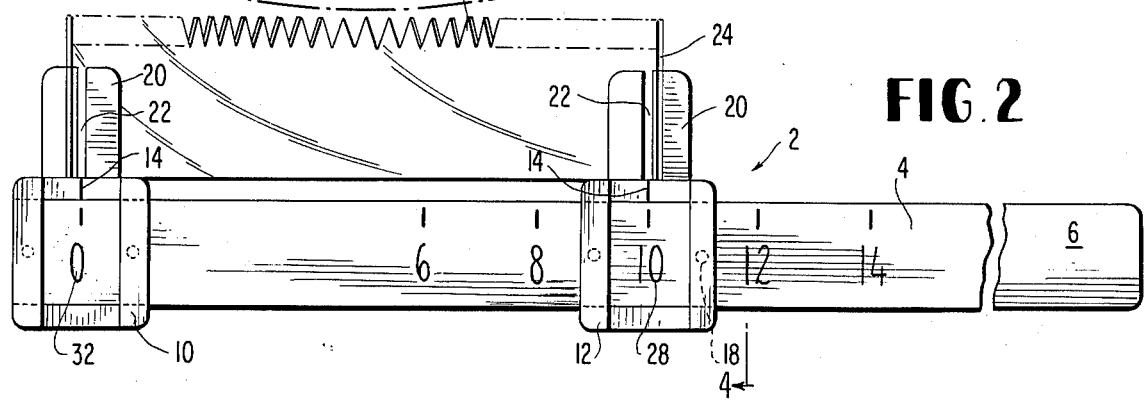
FIG. 2 is a side elevation of the marker as used on a round cake tier.
Figure 3:
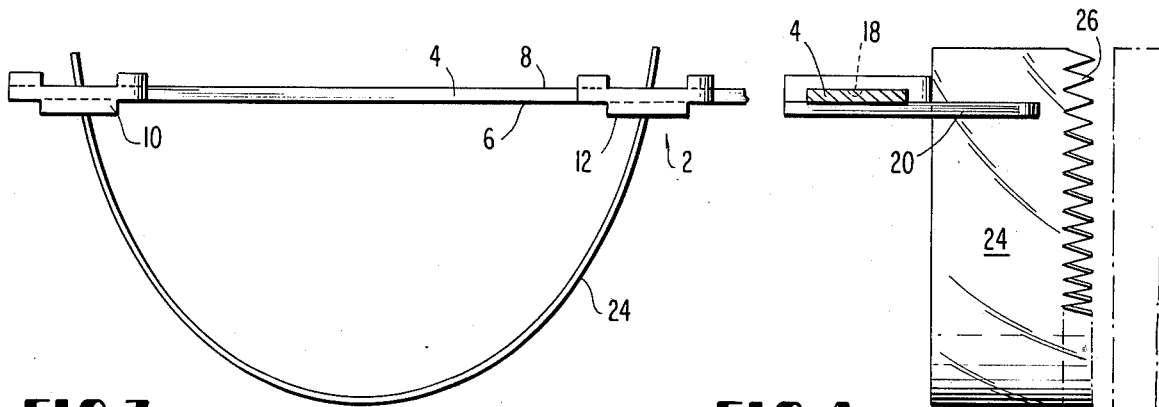
FIG. 3 is a bottom plan view of the garland marker as shown in FIG. 2.
Figure 4:
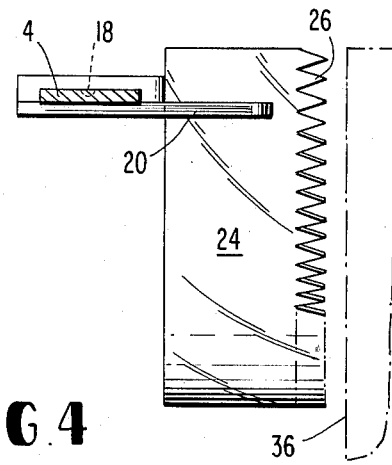
FIG. 4 is a cross section along the line 4—4 of FIG. 2.
Figure 5:
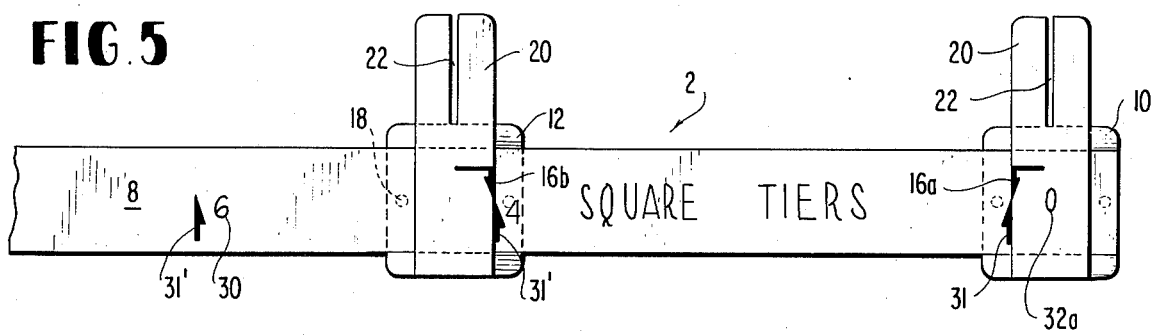
FIG. 5 is a view of the side of the garland marker used for inscribing garland marks on the sides of a square cake tier.

The operation of the marker is as follows: Let it be assumed that garland marks are to be inscribed on the side of a tier of a round cake. Slide 10 is adjusted so that its index mark registers with the "0" mark on side 6 of the rod and slide 12 is adjusted to the index number representing the diameter of the cake tier. As shown in FIG. 1, the slide 12 would be set for inscribing the marks for eight garlands around the sides of a fourteen inch round cake. As shown in FIG. 2 slide 12 is set for inscribing eight garland marks around the side of a ten inch round cake. The depth of the garlands inscribed is determined by the adjustment of resilient strip 24 in slots 22, by which adjustment the depth of the bow of strip 24 is determined. Then the serrations 26 are pressed into the side 34 of the cake (FIG. 2) with a rolling motion. If garlands are to be inscribed on the side 36 of a square cake, side 8 of rod 4 is used. Slide 10 is set with its index arrow 16a registering with the arrow 31 for the zero mark 32a on rod side 8 and slide 12 is adjusted to bring its arrow 16b in registry with the index arrow 31' for the appropriate index number 30 representing the length of the cake side. As shown in FIG. 5, slide 12 is adjusted for applying a 4 inch garland to a side of a square cake tier. If the side of the cake were, for example, 8 inches long, then two 4 inch garlands would be inscribed with the setting as shown in FIG. 5. More index numbers may be used, and if desired, slide 10 can be cemented or otherwise permanently mounted at the "O" mark on the rod. Making the slides identical facilitates manufacture, as by die casting, and also makes the device easier to knock down and assemble, and to package it in a flat package.

I claim:

1. A device for inscribing garlands on the sides of cakes, comprising
    a rod having flat opposite sides
    a pair of slides each having
        a portion which embraces the rod
        and a flat tongue having a free end portion which extends outwardly from the rod-engaging portion, each said tongue having flat opposite sides disposed in planes parallel to the flat sides of the rod having a slot which extends therethrough from one flat side thereof to the other inwardly from the free end portion thereof, an elongate bowed flat resilient strip slidably engaged at spaced locations along the length thereof in the slots in said tongue,
    said strip having serrations along an edge thereof,
    a series of graduated numbers on the one side of said rod representing an even number of garlands inscribable on the side of a round cake tier of a given diameter, and
    a series of graduated numbers on the other side of said rod representing an even number of garlands inscribable on a side of a given length of a rectangular cake tier.

* * * * *